US009635974B2

(12) United States Patent
Fischer et al.

(10) Patent No.: US 9,635,974 B2
(45) Date of Patent: May 2, 2017

(54) DEVICE FOR PREPARING AND DISPENSING MILK FOAM OR A DRINK, ESPRESSO MACHINE COMPRISING SUCH A DEVICE AND PREPARATION VESSEL FOR USE IN SUCH A DEVICE OR ESPRESSO MACHINE

(75) Inventors: Daniel Fischer, Romanshorn (CH); Christian Brendle, Eilen (CH)

(73) Assignee: EUGSTER/FRISMAG AG, Amriswil (CH)

( * ) Notice: Subject to any disclaimer, the term of this patent is extended or adjusted under 35 U.S.C. 154(b) by 1025 days.

(21) Appl. No.: 12/736,682

(22) PCT Filed: Mar. 31, 2009

(86) PCT No.: PCT/EP2009/002358
§ 371 (c)(1),
(2), (4) Date: Jan. 18, 2011

(87) PCT Pub. No.: WO2009/132743
PCT Pub. Date: Nov. 5, 2009

(65) Prior Publication Data
US 2011/0111109 A1  May 12, 2011

(30) Foreign Application Priority Data
Apr. 30, 2008  (DE) .................... 10 2008 021 778

(51) Int. Cl.
*A47J 31/44* (2006.01)
*A47J 31/41* (2006.01)

(52) U.S. Cl.
CPC .......... *A47J 31/4489* (2013.01); *A47J 31/41* (2013.01)

(58) Field of Classification Search
CPC ....................... A47J 31/41; A47J 31/4489
See application file for complete search history.

(56) References Cited

U.S. PATENT DOCUMENTS

D268,978 S  *  5/1983  Strieber .................... D7/319
5,724,883 A     3/1998  Usherovich
(Continued)

FOREIGN PATENT DOCUMENTS

DE          1 730 508          9/1956
DE      295 19 635 U1          4/1996
(Continued)

*Primary Examiner* — Elizabeth Gwartney
(74) *Attorney, Agent, or Firm* — Norton Rose Fulbright US LLP

(57) ABSTRACT

According to a method for preparing and dispensing milk foam a drink made of powdered milk of self-dissolving drink preparation powder, improved milk foam not directly consumed from a preparation vessel (6) is intended to be foamed easily. To this end, at least one hot water stream (2a) is applied to the milk powder or drink preparation powder in the above open or opened preparation vessel (6), in particular a foaming vessel, said hot water stream flowing out of a hot water channel under hot water pressure. The preparation vessel (6) is fixed. The milk foam (22) or drink so prepared in the preparation vessel automatically flows, i.e. merely by way of the effect of the hot water stream and the force of gravity, from the preparation vessel (6) through a laterally and/or downwardly led discharge of the preparation vessel or through an outlet spout to a collection vessel (4), preferably a cup or a glass.

6 Claims, 3 Drawing Sheets

(56) References Cited

Figure 1:
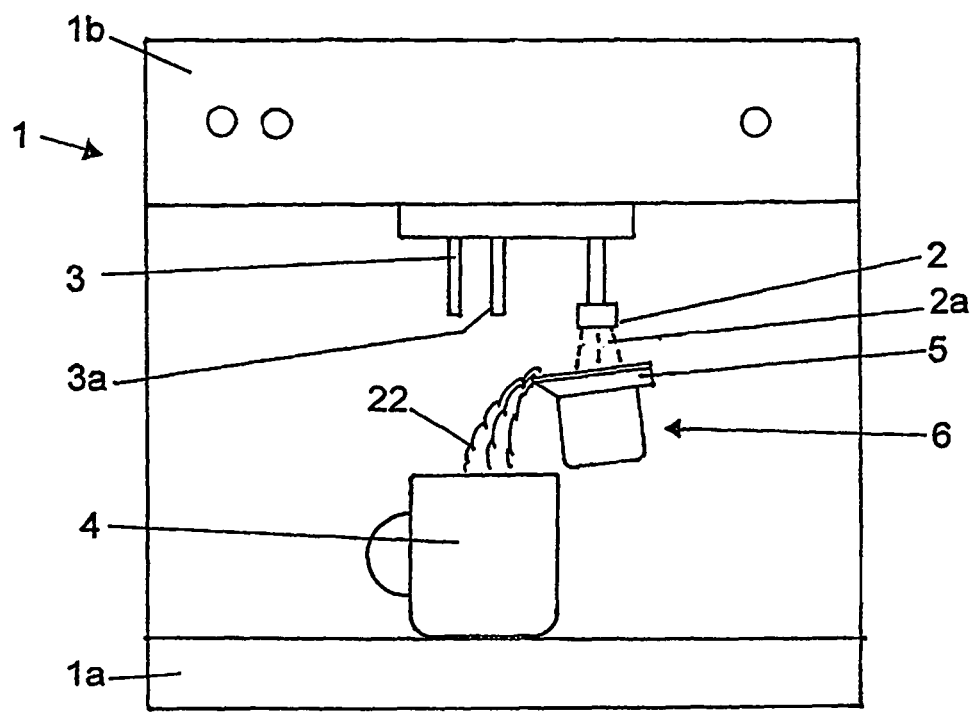

U.S. PATENT DOCUMENTS 7,353,751 B2 4/2008 Takizawa
2009/0011105 A1* 1/2009 Mahlich ............... A47J 31/401
426/564

FOREIGN PATENT DOCUMENTS

| | | |
|---|---|---|
| DE | 10 2004 063 278 A1 | 7/2006 |
| DE | 10 2006 008 341 B3 | 7/2007 |
| DE | 20 2007 008 815 U1 | 1/2008 |
| DE | 20 2006 014 317 | 3/2008 |
| EP | 0 060 645 A1 | 9/1982 |
| EP | 0 509 505 A2 | 10/1992 |
| EP | 2 025 270 A2 | 2/2009 |
| GP | 2 163 727 | 3/1986 |
| JP | S61-56616 | 3/1986 |
| NR | 304 794 | 6/1973 |
| WO | WO 2004/089173 A2 | 10/2004 |

* cited by examiner

DEVICE FOR PREPARING AND DISPENSING MILK FOAM OR A DRINK, ESPRESSO MACHINE COMPRISING SUCH A DEVICE AND PREPARATION VESSEL FOR USE IN SUCH A DEVICE OR ESPRESSO MACHINE

The invention includes a method for preparing and dispensing milk foam or a drink made of powdered milk or self-dissolving drink preparation powder.

For both of the two above preparation variants, therefore, self-dissolving powder is used, particularly cocoa powder for a hot cocoa drink.

A further aspect of the invention is a device for carrying out the above method.

A still further aspect of the invention concerns an espresso machine including such a device.

Finally, the invention relates to a preparation vessel which is particularly suited for use in the above device or espresso machine.

The term espresso machine used in the present context should be understood as to also refer to a coffee machine which comprises, as usual, a fresh water container, a water heater, particularly in the form of a continuous-flow water heater, a hot water pressure generator, particularly as a pump upstream of the continuous-flow water heater, a brewing device and at least one outflow pipe connected therewith for espresso or coffee, below which a cup may for instance be placed as a collection vessel. From this collection vessel, the espresso or the brewed coffee will, as a rule, be consumed.

In order to prepare drinks from powder with cold or hot water directly in a vessel which can also be used for consuming the drink, a discharge device has been known which includes two or more ejectors connected with a water container and a pump and which is disposed in such a way that each ejector injects one liquid jet into a vessel at a discharge station (EP-A-0 060 645). The ejectors are evenly arranged about a central axis each ejector being inclined in a plane spaced from the central axis relative to the vertical. The liquid jets flowing out from the ejectors impinge in the vessel onto an area on the inner wall or nearby thereof. A further ejector may be provided in the central axis. By means of the outer ejectors arranged tangentially inclined, water jets are generated which so impinge onto the powdered material on the bottom of the vessel that, by means of the water discharged, it is brought into a circulating whirling motion in order to be rapidly dissolved. By means of the liquid pressure of the pumped water, air is entrained together with the water jets so that the drink being formed, particularly hot chocolate, may be foamed up. The drink prepared, however, also foamed up chocolate, remains obviously up to its consumption in the vessel in which it was prepared after the powdered material was batched in.

For milk foam preparation from self-dissolving powdered milk with hot water in order to prepare, in particular, a high-class cappuccino, a coffee machine including a milk foam generation device has already been known (DE 10 2006 008 341 B3). A hot water sprinkler head of this milk foam generation device includes downwardly directed and downwardly open hot water channels, some of which, near an outer cylindrical shell surface of the hot water sprinkler head, are completely, or at least in a lower section, inclined relative to the perpendicular in circumferential direction of the shell surface and, in addition, are preferably inclined radially toward the outside. The hot water channels are connected via a hot water distributing chamber in the hot water sprinkler head with the hot water pressure generator and the water heater of the coffee machine. For milk foam preparation it is, in this way, achieved that from the hot water channels, hot water jets are ejected having a twist in circumferential direction of the hot water sprinkler head and impinge onto the milk powder, which promotes the intermixture of the powder with the hot water and the almost contemporaneous foaming up. The milk foam is generated in a foaming vessel placed under the hot water sprinkler head on a base of the coffee machine and may, subsequently, be combined with espresso or coffee which had been prepared in the same machine. For milk foam generation, the foaming device which may cylindrically be shaped, is placed, horizontally and vertically directed, on the horizontal base. It is only subsequently and if required that it is manually tilted for combining the milk foam with the espresso or the coffee.

In the case of espresso machines having steam ejectors without the above-described hot water sprinkler head, the outlet of the steam ejector is guided by hand, for foaming up milk for the preparation of cappuccino, above the surface of milk which is in a vessel so that, when the steam flows out, a three-phase zone consisting of steam-air-milk—is formed by which the milk foam is developed. In most cases, however, such preparation procedure is optimally mastered by professional users only.

It is an object of the present invention to generate from powdered milk, without any high demands on the skillfulness of the operating personnel, improved milk foam for further use, particularly for cappuccino preparation or, generally, from self-dissolving powder a hot drink which is not to be directly consumed from the foaming vessel or the preparation vessel.

From the powdered milk, or the self-dissolving drink preparation powder in the preparation vessel, not only an easily further usable milk foam, or otherwise, a drink to be presented in a more attractive vessel is generated in this way by the hot water jet flowing from the hot water channel or preferably by the hot water jets flowing from the hot water channels, but the foam or the drink is rather, contemporarily, conducted into the vessel provided for further use of the foam or for presenting the drink, which in this case serves as collection vessel, while not necessitating any manipulation by the service personnel. The good flavor of the prepared foam or of the drink remains extensively preserved. Both the preparation vessel and the collection vessel may optimally be adapted to their purposes.

In the present case, a preparation vessel is used which has a lateral and/or downwardly conducted outlet or a pouring spout wherein the outflow, or the pouring spout, depending on size and shape, guarantees a controlled outflow process of the slow-flowing milk foam prepared in the preparation vessel or of the foamed up hot drink, such as hot chocolate, while not disturbing the handling and/or the aesthetics of the collection vessel which is used as a rule for the consumption of the final product.

The milk foam or the drink flows merely by the influence of the hot water jets and of the force of gravity from the preparation vessel into the collection vessel the preparation vessel being fixed in an optimized position while the powdered milk or the soluble drink preparation powder is treated with the hot water jets.

The kinetic energy imparted at the same time to the milk foam or drink prepared by the hot water jets improves the transportation of the milk foam or the drink into the collection vessel, particularly if the milk foam or the drink in the preparation vessel is set into rotary movement.

A device suited for the solution of the above mentioned task by means of which the method of the invention is carried out may generally be realized by an individual device for all functions enumerated above or may be integrated in an espresso or coffee machine.

The device may be used for the preparation of both milk foam and of a drink to which end only the hot water jet pressure has to be adapted or to be set, which can be effected on the hot water steam generator, particularly the water pump. If a hot water jet pressure for milk foam production is optimized, it can be simply reduced for the preparation of drinks. In the latter case, less air is drawn in with the hot water jet, which reduces the foam formation or does not permit it to come up.

By detachably placing and positioning the preparation vessel or the foaming up vessel on the device according to the present invention, it is achieved, to start with, that the preparation vessel is reliably kept in a position on the device relative to the hot water jet generator in which milk foam or the drink of constantly high quality is generated by treating the powdered milk or the drink preparation powder contained in the preparation vessel with the at least one hot water jet flowing out from the hot water jet generator.

In the hot water jet generator provided in the device according to the present invention, at least one hot water channel is formed out which generates at least one hot water jet which is directed into the fixed, detachable, preparation vessel containing powdered milk or self-dissolving drink preparation powder, onto or near the inner wall thereof. In this connection, both the preparation vessel and the collection vessel are so designed and so positionable that the collection vessel automatically receives the foamed up milk foam or the drink prepared in the preparation vessel. In this way, the powdered milk or the self-dissolvable drink preparation powder batched into the preparation vessel is penetrated by the hot water jet developing, by the inclusion of air, milk foam or a foam-containing drink which automatically flows over into the collection vessel.

The above mentioned detachable application and positioning of the preparation vessel on the device and thus to a collection vessel arranged in a positioned way guarantees that the produce being developed in the preparation vessel will arrive in the collection vessel in a controlled way. It is not necessary to demand high requirements as to attentiveness and skillfulness by the operating personnel. By the detachable application of the foaming up vessel on the device, in addition, the danger of scalding of the operating personnel can be reduced or avoided.

In the hot water jet generator provided in the device according to the present invention, at least one hot water channel is downwardly tangentially inclined in a plane distant from a central axis of the water jet generator and/or of the preparation vessel. From the hot water channel so designed, an obliquely downwardly inclined straight hot water jet is emitted which impinges onto the powdered milk or the self-dissolving drink preparation powder on the bottom of the preparation vessel batched into the preparation vessel and, in view of the circulating whirling movement, generated by the kinetic energy thereof, developing by deflection of the hot water jet at the preferably cylindrical inner wall of the preparation vessel, intensively intermixes the preparation powder with the hot water and improves the foam formation. By the circulating movement of the milk foam, in addition, a controlled emptying of the milk foam overflowing from the preparation vessel into the collection vessel, with preference a cup, is promoted.

A preferred embodiment of the hot water jet generator employed in the device involves a particularly efficient hot water sprinkler head. This rotation-symmetrical hot water sprinkler head having hot water channels inclined in circumferential direction relative to the perpendicular near an outer shell surface of the hot water sprinkler head can generate hot water jets which emerge downwardly, with a twist, from the hot water channels. If the hot water channels are additionally inclined radially outwardly relative to a perpendicular central axis, the hot water jets receive a respective directional component radially inclined outwardly. The hot water jets are directed into the preparation vessel substantially cylindrical in its interior which is detachably locked on the device and preferably coaxially positioned relative to the hot water sprinkler head. Thereby, the hot water jets are preferably directed to or near the inner wall of the preparation vessel into it so that they impinge onto the powder in the preparation vessel at an even distribution generating at the same time, due to their twist, a rotational whirl and obtain an homogeneous intermixing of the powder and foaming before the milk foam from the preparation vessel flows in controlled manner into the collection vessel which, on its part, is positioned relative to the preparation vessel.

It is possible to generate a rotating whirl efficient for the dissolution of the powder with hot water and, if required, foaming up in the preparation vessel, which may promote the outflow into the collection vessel, by a simple hot water sprinkler head according to the present invention in which a plurality of hot water channels near an outer surface of the hot water sprinkler head are formed out spaced relative to each other, straight and if necessary radially inclined to the outside, wherein the hot water sprinkler head relative to the substantially cylindrical preparation vessel is disposed eccentrically and downwardly inclined so that the hot water jets impinge, at least partly, tangentially and downwardly inclined onto an inner wall area of the preparation vessel. As different from the above described preferred embodiment, the preferably substantially cylindrical inner wall in this case is not evenly impacted over the complete circumference thereof.

In place of a hot water sprinkler head, a single jet may serve, according to the present invention, as a hot water jet generator. By disposing this jet eccentrically and downwardly inclined relative to the preferably substantially cylindrical preparation vessel so that the hot water jet impinges tangentially downwardly inclined onto an inner wall area of the preparation vessel, a rotating whirl in the bottom area of the preparation vessel may be generated, too, while in this case, however, the jet will impact the circulating self-dissolving powder only in that interior wall area onto which it is directed.

In order to impact the self-dissolving powder in the central bottom area of the preparation vessel as well, at least one further hot water channel is formed out, according to the present invention, in the hot water sprinkler head in the fictive central axis of the hot water sprinkler head, or in parallel near the central axis.

To serve the same purpose, in the case that the hot water jet generator is realized by a jet eccentrically downwardly disposed relative to the preparation vessel, this eccentric jet is supplemented, according to the present invention, by a further jet which relative to the preparation vessel which is preferably substantially cylindrical at the inside, is directed concentrically downward to the bottom thereof.

For carrying out the invention, a preparation or foaming up device as mentioned above is required having a lateral and/or downwardly directed outflow below which, according to the present invention, the collection vessel open on top is positioned. As the outflow, a pouring spout may, according to the present invention, simply formed out on the upper edge portion of the preparation vessel. When the preparation vessel has been placed in a predetermined position on the coffee machine and the collection vessel open on top, particularly a cup, has been placed, according to the present invention, under the outflow, the milk foam, or the drink, developing in the preparation vessel may in a clean way flow via the outflow directly into the collection vessel.

The preparation vessel is adapted in particular to the means for the positioning and detachable placement thereof on the device.

A purely mechanical embodiment of the means for positioning and attaching the preparation vessel according to the present invention may be realized by an annular receiving means. The latter constitutes an open receiving face into which the corresponding preparation vessel may detachably be clipped in, or hung in, which then will be held by the receiving means. To this end, the adapted preparation vessel includes, at its bottom and above it, cross sections similar to the receiving face and smaller than it. It is only at an upper edge portion that the foaming vessel projects outwardly so that it can rest on the annular receiving means. Preferably, the receiving means is simply circular-ring shaped and the adapted preparation vessel, except the upper edge portion, is substantially cylindrical.

To set an angle of inclination of the preparation vessel, to be explained further below, the annular receiving means may, according to the present invention, be pivotally supported.

Alternatively, the device may include as a means for positioning and magnetic attachment of the preparation vessel, according to the present invention, a position gauge and a stationary axially polarized disc magnet. The rugged preparation vessel adapted hereto includes as the docking means a ferromagnetic element on the side by means of which the preparation vessel may detachably be held in the position on the disc magnet set by means of the position gauge. The axially polarized disc magnet and the ferromagnetic element may, instead of the above arrangement, analogously inversely be disposed on the preparation vessel or on the device.

A particularly preferred embodiment of the means for positioning and magnetic attachment of the preparation vessel is based, according to the present invention, on that on the device a first axially polarized disc magnet having two magnetic poles opposite to each other is disposed. The respective, preferably rugged, preparation vessel in this case includes, laterally, a second axially polarized disc magnet having two second magnetic poles opposite to each other which, insofar, is formed similarly or identically to the first disc magnet of the device. The disc magnets each are so arranged on the device and on the preparation vessel that in the docked-on state of the foaming vessel one of the north poles and one of the south poles each of the two disc magnets are disposed to face each other, that is that two pairs of poles each of opposite polarization attract each other.

The automatic transfer or controlled flow of the milk foam or drink from the preparation vessel into the collection vessel may be obtained in that, according to the present invention, the means for positioning and attaching the preparation vessel are so designed and arranged on the device that the preparation vessel is kept inclined about an acute angle relative to the horizontal on the device. In this way, an uncontrolled overflow of the preparation vessel is avoided.

The data relative to the positioning of the preparation vessel at a position inclined at an acute angle relative to the horizontal refer to a normal horizontal installation of an espresso machine or of the device.

The angle at which the preparation vessel is inclined relative to the horizontal is preferably from 3 to 15°.

Corresponding thereto, the annular receiving means referred to further above may be adjusted inclined about the acute angle relative to the horizontal.

In the case of the above referenced means, for positioning and magnetic attachment of the preparation vessel, for docking or placing the preparation vessel on the device in a position inclined about the acute angle relative to the horizontal, at least one of the two disc magnets is rotated about a virtual horizontal axis passing at right angles through the respective disc magnet which is attached to the coffee machine or the foaming vessel. In this way, the preparation vessel when approached to the device is automatically aligned by magnetically generated forces or torques and is maintained in the aligned position. Therefore, the docking process requires only little attention by the operating personnel.

The above-described device for carrying out the the present invention may be an integral part of an espresso machine the present invention. In this case, advantageous functional units of the espresso machine, such as its fresh water container, hot water pressure generator, particularly the pump, water heater, particularly continuous flow heater, may alternatively be used by switch-over of the water heater at the output side for the generation either of milk foam or of a beverage made of powdered milk or self-dissolving drink preparation powder.

In this case, at least one outlet pipe of the espresso machine for espresso/coffee is preferably arranged, according to the present invention, in such a way that the collection vessel provided to receive the espresso/coffee is simultaneously positioned to receive milk foam or a beverage from the preparation vessel. The operating personnel need not, therefore, care for different placements of the collection vessel. Without replacement, the collection vessel can receive for instance firstly coffee and on top of it milk foam.

One aspect of the invention, as mentioned further above, refers to the design of a preparation vessel suited for use at the device or the espresso machine having the above-discussed features.

In a particularly simple embodiment, such a preparation vessel consists, according to the present invention, of a pot open on top from the upper edge portion of which the outflow spout, particularly for slow outflow of milk foam, is formed out.

In order to use the afore-described preparation vessel in a device or espresso machine having an annular receiving means according to the present invention, the preparation vessel is provided with an upper edge portion which overhangs over the subsequent lower portion of the pot to the outside. In this way, the preparation vessel may reliably be hung into the annular receiving means.

The two afore-described embodiments of the preparation vessel may be made rugged to be used again. Between two preparation or foaming-up processes, therefore, they may be removed from the receiving means, may be cleaned and used again.

A preparation vessel may particularly advantageously be made as a portion package and throw-away article according to the present invention with the features that the pot is thin-walled and substantially cylindrical, that the upper edge portion of the pot is substantially flat and ring-shaped and is closed by a lid sealed with the edge portion, the closed pot holding one portion of foamable milk powder. This preparation vessel serves for use on a device or espresso machine with substantially annular receiving means for the preparation vessel.

In particular, the lid may be provided as a tear-off foil having a tear-off tongue according to the present invention, wherein the tear-off tongue is welded to the flat annular edge portion of the pot. In such a portion package, a pre-portioned amount of powdered milk or a drink preparation powder which had hygienically been kept in the pot up to the use thereof can be simply released by tearing the tearing foil off before the foaming or preparation process is initiated.

Suitably, the pot of the preparation vessel designed as a throw-away article may consist, according to the present invention, of a humidity-tight, aroma-tight and oxygen-impermeable material and may have a material-saving thickness of from 15 to 8 μm. Notwithstanding the relatively small thickness of the pot, the powdered milk or drink preparation portion may be stored unharmed for a long period of time.

This is particularly the case, if the lid is made similarly to the pot of a humidity-tight, aroma-tight and oxygen-impermeable material. As a humidity-tight, aroma-tight and oxygen-impermeable material, aluminium in particular is suited, according to the present invention, for the pot and/or the lid.

Instead, however, the pot and/or the lid may as well consist, according to the present invention, of purely plastic material.

A pot consisting of a multi-layer foil according to the present invention may have particularly favorable properties.

Such a multi-layer foil is preferably constituted by a carton/aluminium/plastic laminate according to the present invention.

In the case in which the preparation vessel is to be positioned and placed or docked on a first disc magnet arranged on the device or the espresso machine, the preparation vessel is preferably not provided as a throw-away article but rather as a rugged re-usable pot of plastic material. In this case, the pot carries, according to the present invention, the second magnet. The second disc magnet is axially polarized for automatic alignment of the pot on the device, or the espresso machine, and includes two magnetic poles opposed relative to each other which cooperate with a suitable pole disposition of the first disc magnet.

Figure 2:
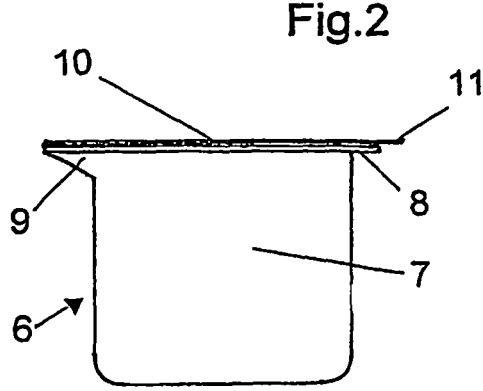
Figure 3:
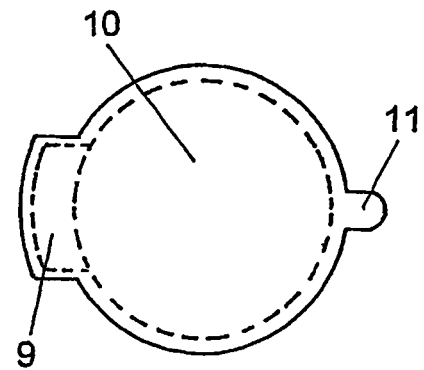
Figure 4:
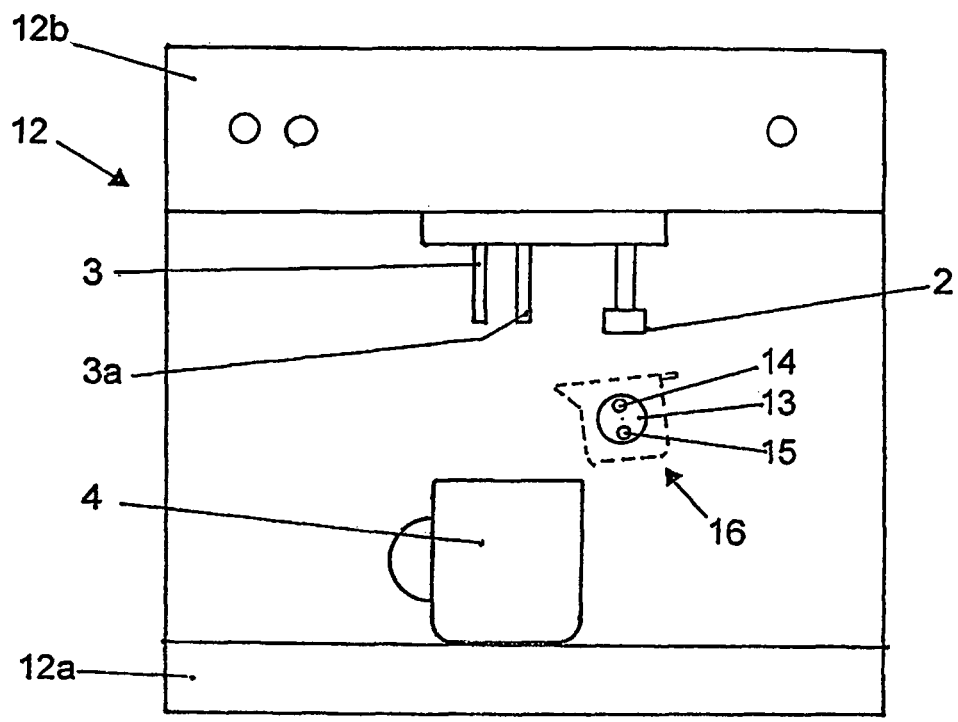
Figure 5:
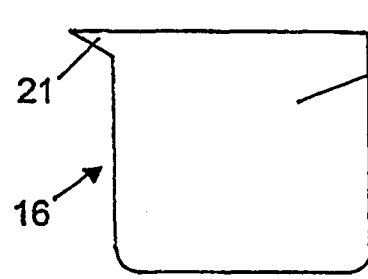
Figure 6:
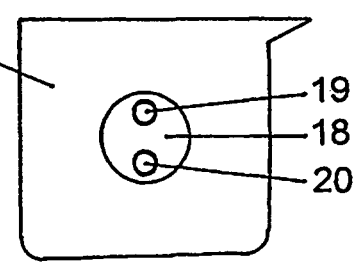
Figure 7:
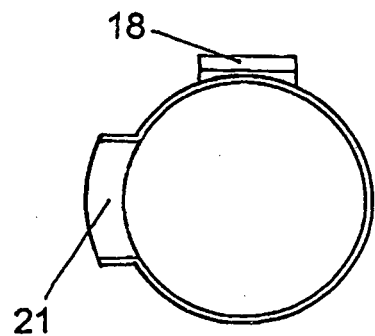
Figure 8A:
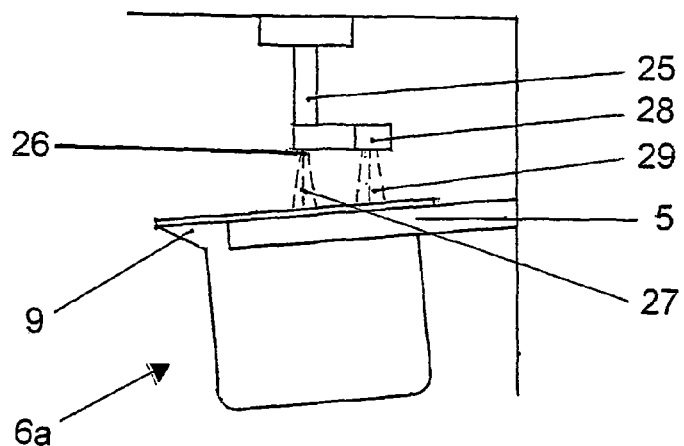
Figure 8B:
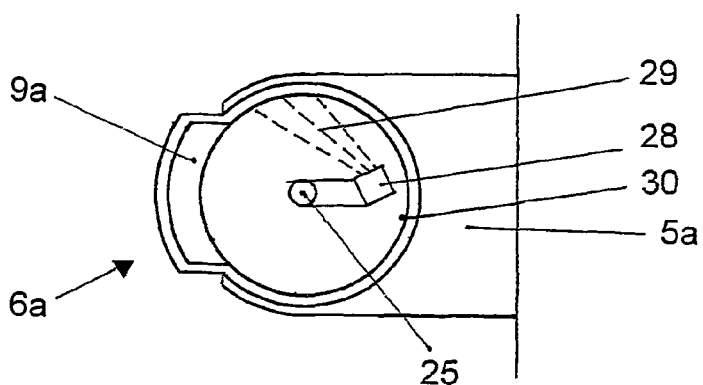
Figure 9:
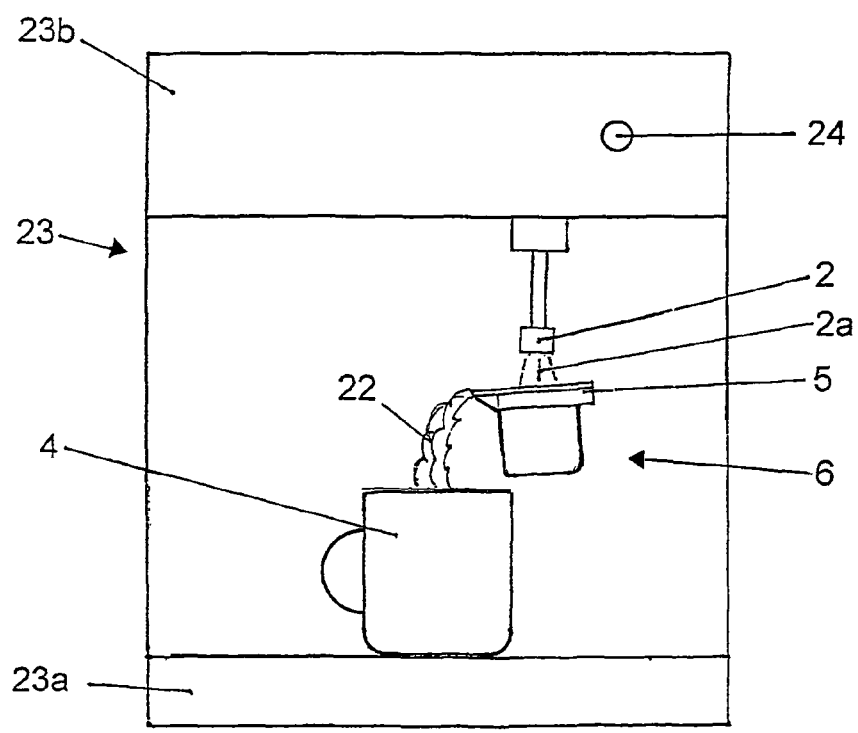

Exemplified embodiments of the device of the invention for the preparation and dispensing of milk foam or of a drink made of powdered milk or self-dissolving drink preparation powder as well as of the preparation vessel adapted thereto will be described in the following based on a schematic drawing including the following figures wherein FIG. 1 is a front view of an espresso machine with a first embodiment of an integrated device and with the preparation vessel hung in, FIG. 2 is a lateral view on the preparation vessel according to FIG. 1, FIG. 3 is a top view on the preparation vessel according to FIG. 2, FIG. 4 is a front view of an espresso machine including a second embodiment of an integrated device, and including a preparation vessel indicated by broken lines, FIG. 5 is a front view of the embodiment of the preparation vessel according to FIG. 4, FIG. 6 is a view of the reverse side of the preparation vessel according to FIG. 5, FIG. 7 is a top view on the preparation vessel according to FIGS. 5 and 6, FIG. 8a is a lateral view as a sectional view on a third embodiment of the device, FIG. 8b is a top view on the device according to FIG. 8a, and FIG. 9 is a front view of a fourth embodiment of the device as an independent device.

The scales of the representations of the figures might be different.

Corresponding elements of the embodiments, as a rule, carry identical reference numerals.

In FIG. 1, reference sign 1 designates an espresso machine having an integrated device for preparing and dispensing milk foam or a drink made of powdered milk or self-dissolving drink preparation powder on the front side of which one hot water sprinkler head 2 and, spaced aside, outflow pipes 3, 3a for espresso and coffee or cappuccino are provided. The hot water sprinkler head 2 in the espresso machine is connected with a water heater and a hot water pressure generator, particularly a pump, not visibly shown in the drawing.

Not shown, furthermore, in FIG. 1 are the usual means for espresso or coffee or cappuccino preparation which are also connected with the water heater and the water pressure generator. Spaced under a head portion 1b of the espresso machine from which the outflow pipes 3, 3a for espresso or coffee as well as the hot water sprinkler head 2 project downwardly, there is a base 1a of the espresso machine on which, under the outflow pipes 3, 3a, a collection vessel 4 may be placed.

The hot water sprinkler head 2 includes hot water channels, not shown in the drawing, which are arranged in the interior near the cylindrical outer wall of the hot water sprinkler head 2 and are inclined in the peripheral direction of the hot water sprinkler head.

Below the hot water sprinkler head 2, but spaced above the base 1a of the espresso machine, an annular receiving means 5 is projecting from the front side thereof, of which in FIG. 1 only the outer edge of one ring is visible which in the present case limits a circular-disc shaped open receiving surface towards the outside. The receiving surface perpendicularly oriented relative to the plane of the drawing is inclined, as in accordance with the lateral inclination shown in FIG. 1 of the annular receiving means 5 relative to the horizontal, about an acute angle. The annular receiving means 5 is disposed below the hot water sprinkler head 2 in such a way that the hot water flowing out from it during the operation of the hot water sprinkler head 2 completely flows into a cylindrical foaming vessel or preparation vessel 6 that is placed in the annular receiving means 5.

The preparation vessel 6 in the embodiment shown in detail in FIGS. 2 and 3 is made as a throw away article, i.e. a portion unit closed before being used which contains a dosed portion of foamable powdered milk or self-dissolving drink preparation powder. In detail, the preparation vessel 6 consists of a thin-walled substantially cylindrical pot 7 having an upper flat edge portion 8 which is essentially annular. At one spot of the upper edge portion, a pouring spout 9 is formed out. Prior to use, the pot 7 is closed by a tear-off foil which is humidity-tightly, aroma-tightly and oxygen-impermeably welded to the upper edge portion 8 of the pot and from which a tear-off tongue projects for convenient removal of the tear-off foil. The tear-off foil 10 and the pot 7 consist of humidity-tight, aroma-tight and oxygen-impermeable materials. The pot 7 may for instance consist of a respectively suited plastic material and the tear-off foil 10 may consist of aluminium.

In connection with the espresso machine according to FIG. 1, it would, however, also be possible to place into the annular receiving means 5 a normally open reusable preparation vessel which is made thick-walled and robust and which, after a foaming up process, may be removed from the receiving means 5 to be cleaned and to be re-inserted again.

For the preparation of milk foam—while the preparation of a drink of self-soluble powder would analogously be made—the open, or opened, foaming vessel or preparation vessel 6 is inserted into the annular receiving means 5 so that the pouring spout 9 is on the lowermost position, as shown in FIG. 1. The preparation vessel 6 takes up one milk powder portion which has either been pre-portioned in the preparation vessel 6 of the kind of a portion capsule or is filled into a preparation vessel formed with the top open. Below the pouring spout 9, the collection vessel open on top is placed which may contain espresso or coffee prepared in an earlier process. After this preparation, a hot water supply to the hot water sprinkler head 2 is activated so that the hot water flowing out from it impinges with a twist onto the powdered milk in the preparation vessel 6, dissolves it and, by admixing air, foams it up immediately. The developing volume of the milk foam flows over the pouring spout into the collecting vessel 4 placed underneath which in this case, when suitably placed on the base 1a of the espresso machine, need not be readjusted. Considering that the operation position of the preparation vessel 6 in the receiving means 5 relative to the hot water sprinkler head has been defined, milk foam of constant quality attractive both as to taste and to the eye may easily be produced without any difficulties even by non-experienced operating personnel.

In FIG. 4, the espresso machine 12 of the second embodiment of the device having also a base 12a and a head section 12b is shown from which project the outflow pipes 3, 3a for espresso or coffee and the hot water supply for the hot water sprinkler head 2.

As different from the first embodiment of the integrated device, there is solidly secured to the front side of the espresso machine 12, in the area between the base 12a thereof and the hot water sprinkler head 2, a first disc magnet 13 which is axially so polarized and arranged that the south pole 14 thereof and the north pole 15 thereof are not exactly vertically disposed one above the other but rather inclined relative to the vertical about an acute angle at the side, i.e. in this case on the front side of the espresso machine 12. This arrangement of the south pole 14 and of the north pole 15 is in relation to the arrangement of the north pole 19 and of the south pole 20 of the disc magnet 18 on the preparation vessel 16, and might also be different, for instance if the north pole 19 and the south pole 20 of the disc magnet 18 on the preparation vessel were arranged at a horizontal distance relative to each other.

For the detachable aligned attachment of a preparation vessel 16 to the first disc magnet 13 of the espresso machine, the preparation vessel 16, i.e. the portion shaped as a pot 17 open on top thereof, is laterally provided with an axially polarized disc magnet 18 as well which is also referred to as the second disc magnet 18. The north pole 19 and the south pole 20 thereof are disposed in spaced relationship vertically one above the other; as relative to the arrangement, however, of the south pole 14 and the north pole 15 of the first disc magnet 13 on the espresso machine, they are quasi opposite or twisted, as an overall view of FIGS. 4 and 6 of the drawing will indicate.

As different from the second ferromagnetic disc magnet 18, the pot 17 of the preparation vessel consists of non-ferromagnetic material, particularly of a plastic material.

The re-usable preparation vessel 16 which is always open on top includes in its upper edge portion which is not specifically designated and which need not project flat and annularly above the cylindrical pot, an outflow spout 21.

In order to prepare milk foam, the preparation vessel 16 is simply docked to the front side of the coffee machine 12 in that it is moved with its second disc magnet 18 to the first disc magnet 13 of the coffee machine. Due to the forces acting towards each other through the two disc magnets 13, 18, the preparation vessel 16 is not only drawn towards the first disc magnet 13 of the espresso machine but is also aligned in a laterally inclined way, as indicated by the broken line in FIG. 4.

Prior to a milk foam preparation, powdered milk is batched into the preparation vessel 16 after which the preparation water supply, or hot water supply, to the hot water sprinkler head may be activated so in this case, too, as in the first embodiment according to FIG. 1, milk foam is prepared which flows via the outflow spout 21 directly over into the collection vessel 4.

In FIG. 1, the overflowing milk foam is designated by reference sign 22 which flows over in the same way in the embodiment according to FIG. 4, but is not shown therein.

Portions of the third embodiment of the device for preparing and dispensing milk foam or a drink made of powdered milk or self-dissolving drink preparation powder are shown in FIGS. 8a and 8b so that they might either be an integral constituent of an espresso machine, as shown in FIGS. 1 and 4 at positions 1 and 12, or constitute a substantial external portion of an independent device for preparing and dispensing milk foam or a drink made of self-dissolving powder, similarly as in FIG. 9.

The third embodiment shown in FIGS. 8a, 8b includes, instead of a cylindrical hot water sprinkler head having hot water flow channels, below on a hot water supply connection 25, a central ejector 26 which directs a central hot water jet 27 into the bottom area of the preparation vessel 6a substantially coaxially hung into the receiving means 5a. Furthermore, an eccentric ejector 28 is both mechanically and flowingly connected via a non-designated arm which holds the eccentric ejector 28 displaced to the side, as shown in FIGS. 8a, 8b, with the hot water supply connection 25. The arrangement of the eccentric ejector 28 results furthermore from the course of the eccentric hot water jet 29 delivered by it which is downwardly directed with a tangential component towards the cylindrical preparation vessel inner wall 30, i.e. to the bottom area. In view whereof, a rotating whirl of the powder/hot water mixture is generated in the preparation vessel 6a which may effect homogeneous intermixing.

In FIG. 9, a device 23 for preparing and dispensing milk foam or a drink made of powdered milk or self-dissolving drink preparation powder is diagrammatically shown as a compact independent individual device. It includes a fresh water container, a water heater and a hot water pressure generator, particularly a pump. The water heater is connected via a hot water connection, not designated, downwardly projecting from a head section 23b of the device, with a hot water sprinkler head 2 as in the first embodiment according to FIG. 1. In the same way, a receiving means 5 holds a preparation vessel 6, batched for instance with powdered milk, at a slight inclination which during the course of the operation of the device permits milk foam 22 to flow in a controlled manner into the collection vessel 4. To this end, the collection vessel 4 is positioned on a base 23a of the device under the preparation vessel 6.

This easy-to-operate device may be switched on and off by a switch knob 24.

LIST OF REFERENCE NUMERALS

1 Espresso machine
1a Base of the espresso machine
1b Head portion of the espresso machine
2 Hot water sprinkler head
2a Hot water jet
3 Outflow pipe for espresso or coffee
3a Outflow pipe for espresso or coffee
4 Collection vessel
5 Annular receiving means
5a Receiving means (having an annular disc shaped opening)
6 (cylindrical) Preparation vessel
6a Preparation vessel
7 Pot
8 Upper annular edge portion
9 Pouring spout
9a Pouring spout
10 Tear-off foil
11 Tear-off tongue
12 Espresso machine
12a Base
12b Head section
13 First disc magnet
14 South pole
15 North pole
16 Preparation vessel
17 Pot
18 Second disc magnet
19 North pole
20 South pole
21 Pouring spout
22 Milk foam
23 Device
23a Base of the device
23b Head section of the device
24 Switch knob
25 Hot water supply connection
26 Central ejector
27 Central water jet
28 Eccentric ejector
29 Eccentric hot water jet
30 Preparation vessel inner wall

The invention claimed is:

1. A device for preparing and dispensing milk foam or a drink made of powdered milk or self-dissolving drink preparation powder, wherein the powdered milk or self-dissolving drink preparation powder in a preparation vessel that is open on top is impacted by at least one hot water jet that flows under hot water pressure from a hot water channel and the milk foam or the drink is thereby prepared, a hot water generator that is in flow-wise connection with a hot water pressure generator and a water heater includes at least one hot water channel that generates at least one hot water jet that is directed onto or near an inner wall of said preparation vessel, said preparation vessel is attached to said device and provided with a lateral and downwardly directed outflow element from which the milk foam or the drink flows over into a collection vessel, and as a means for positioning and attaching said preparation vessel on said device an annular receiving means is provided into which said preparation vessel may be detachably clipped in.

2. The device according to claim 1, wherein said annular receiving means is pivotal.

3. The device according to claim 1, wherein as a means for positioning and attaching said preparation vessel, a position gauge and a stationary axially polarized disc magnet is arranged on said device, and said preparation vessel laterally includes, as a docking means, a ferromagnetic element such that said preparation vessel is detachably held on said disc magnet in alignment with said position gauge.

4. The device according to claim 1, wherein as a means for positioning and attaching said preparation vessel, a first axially polarized disc magnet having two magnetic poles opposed relative to each other is arranged on the device, and said preparation vessel laterally includes, as a docking means, a second axially polarized disc magnet having two poles opposed relative to each other, which is formed similarly or identically to said first disc magnet on said device but with relation to said second disc magnet is disposed on the device so that, in the docked state of said preparation vessel, north poles and south poles of said two disc magnets are disposed each in an opposite polarized relationship to each other.

5. The device according to one of claims 1 to 4, wherein said means for positioning and attaching said preparation vessel is designed and arranged on said device such that said preparation vessel is held inclined about an acute angle relative to horizontal on said device.

6. The device according to claim 5, wherein said angle amounts from 3 to 15°.

* * * * *